US008680722B2

(12) United States Patent
Park

(10) Patent No.: US 8,680,722 B2
(45) Date of Patent: Mar. 25, 2014

(54) LINEAR VIBRATOR HAVING TERMINAL CONNECTIONS THROUGH FIRST COVER

(75) Inventor: Youngil Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 266 days.

(21) Appl. No.: 13/166,078

(22) Filed: Jun. 22, 2011

(65) Prior Publication Data

US 2011/0309692 A1 Dec. 22, 2011

(30) Foreign Application Priority Data

Jun. 22, 2010 (KR) ........................ 10-2010-0059261

(51) Int. Cl.
*H02K 33/16* (2006.01)
*H02K 33/18* (2006.01)
*H02K 41/02* (2006.01)

(52) U.S. Cl.
USPC .............. 310/15; 310/12.16; 310/25; 310/81; 310/1

(58) Field of Classification Search
CPC .... H02K 33/16; H02K 33/18; H02K 41/0356
USPC ............................... 310/15, 25, 81, 12.16, 71
IPC .................................. H02K 33/16, 33/18, 7/065
See application file for complete search history.

(56) References Cited

U.S. PATENT DOCUMENTS

| | | | | |
|---|---|---|---|---|
| 2,689,943 | A * | 9/1954 | Reiber | 333/186 |
| 6,201,320 | B1 * | 3/2001 | Gallavan | 307/131 |
| 2005/0099072 | A1 * | 5/2005 | Fujii et al. | 310/71 |
| 2006/0193107 | A1 * | 8/2006 | Kami et al. | 361/600 |
| 2007/0207672 | A1 * | 9/2007 | Takagi et al. | 439/607 |
| 2009/0087322 | A1 * | 4/2009 | Toyama et al. | 417/410.1 |
| 2009/0243404 | A1 * | 10/2009 | Kim et al. | 310/25 |
| 2010/0127581 | A1 * | 5/2010 | Yun et al. | 310/25 |
| 2010/0253166 | A1 | 10/2010 | Park | |
| 2011/0001385 | A1 * | 1/2011 | Saito | 310/214 |
| 2011/0260560 | A1 * | 10/2011 | Park et al. | 310/25 |
| 2011/0298320 | A1 * | 12/2011 | Kim | 310/71 |
| 2012/0169149 | A1 * | 7/2012 | Yoon et al. | 310/25 |

FOREIGN PATENT DOCUMENTS

| | | |
|---|---|---|
| CN | 101558546 A | 10/2009 |
| KR | 10-2006-0000467 A | 1/2006 |
| KR | 10-2010-0010236 A | 2/2010 |

OTHER PUBLICATIONS

Office Action dated Jun. 24, 2013 in Chinese Application No. 201110165827.4, filed Jun. 20, 2011.
Office Action dated Aug. 12, 2011 in Korean Application No. 10-2010-0059261, filed Jun. 22, 2010.

* cited by examiner

*Primary Examiner* — Terrance Kenerly
(74) *Attorney, Agent, or Firm* — Saliwanchik, Lloyd & Eisenschenk

(57) ABSTRACT

Disclosed is a linear vibrator, the linear vibrator including: a stator including a circuit substrate formed at a bottom surface with a connection terminal and a coil block arranged at an upper surface opposite to the bottom surface and electrically connected to the connection terminal; a first cover arranged at the bottom surface of the circuit substrate and formed with an opening for exposing the connection terminal; a second cover coupled to the first cover in a bottom-opened cylindrical shape; and a vibrator including a magnet arranged inside the coil block, a yoke in which the magnet is mounted, and an elastic member coupled to the yoke and the second cover to vertically vibrate the magnet relative to the coil block.

17 Claims, 8 Drawing Sheets

LINEAR VIBRATOR HAVING TERMINAL CONNECTIONS THROUGH FIRST COVER

This application claims the benefit under 35 U.S.C. §119 of Korean Patent Application No. 10-2010-0059261, filed on Jun. 22, 2010, which is hereby incorporated by reference in its entirety.

BACKGROUND OF THE DISCLOSURE

1. Field of the Invention

The present disclosure relates to a linear vibrator.

2. Description of Related Art

A linear vibrator is applied to various electronic devices, such as mobile phones, game players, joy sticks, etc., to generate vibration.

The linear vibrator generally includes a cylindrically-wound coil, a circuit substrate (board) connected to the coil, a magnet arranged inside the coil, and a spring elastically supporting the magnet. The linear vibrator moves the magnet using a magnetic force generated by the coil and a magnetic force generated by the magnet, to generate vibration.

The conventional linear vibrator is configured in such a manner that a part of the circuit substrate mounted with the coil is protruded to an outside of a case mounted with the coil, the circuit substrate, the magnet and the spring, where the circuit substrate protruded from the case is connected to an electric wire and a driving signal is applied to the coil.

However, it is problematic to securely fix the conventional linear vibrator to the outside circuit substrate, in case the electric wire is used to connect the conventional linear vibrator to the outside circuit substrate.

BRIEF SUMMARY

The present disclosure is to provide a linear vibrator that can be directly mounted on an outside circuit substrate.

Technical subjects to be solved by the present disclosure are not restricted to the above-mentioned description, and any other technical problems not mentioned so far will be clearly appreciated from the following description by the skilled in the art.

In one general aspect of the present disclosure, there is provided a linear vibrator, the linear vibrator comprising: a stator including a circuit substrate formed at a bottom surface with a connection terminal and a coil block arranged at an upper surface opposite to the bottom surface and electrically connected to the connection terminal; a first cover arranged at the bottom surface of the circuit substrate and formed with an opening for exposing the connection terminal; a second cover coupled to the first cover in a bottom-opened cylindrical shape; and a vibrator including a magnet arranged inside the coil block, a yoke in which the magnet is mounted, and an elastic member coupled to the yoke and the second cover to vertically vibrate the magnet relative to the coil block.

The linear vibrator according to the present disclosure has an advantageous effect in that a cover of the linear vibrator is formed with a metal to inhibit destruction caused by shock from drop or shock applied from outside, and an opening for exposing a connection terminal of a circuit substrate arranged inside the cover the linear vibrator is formed to allow the connection terminal of the circuit substrate to be directly mounted to a connection terminal of an outside circuit substrate.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
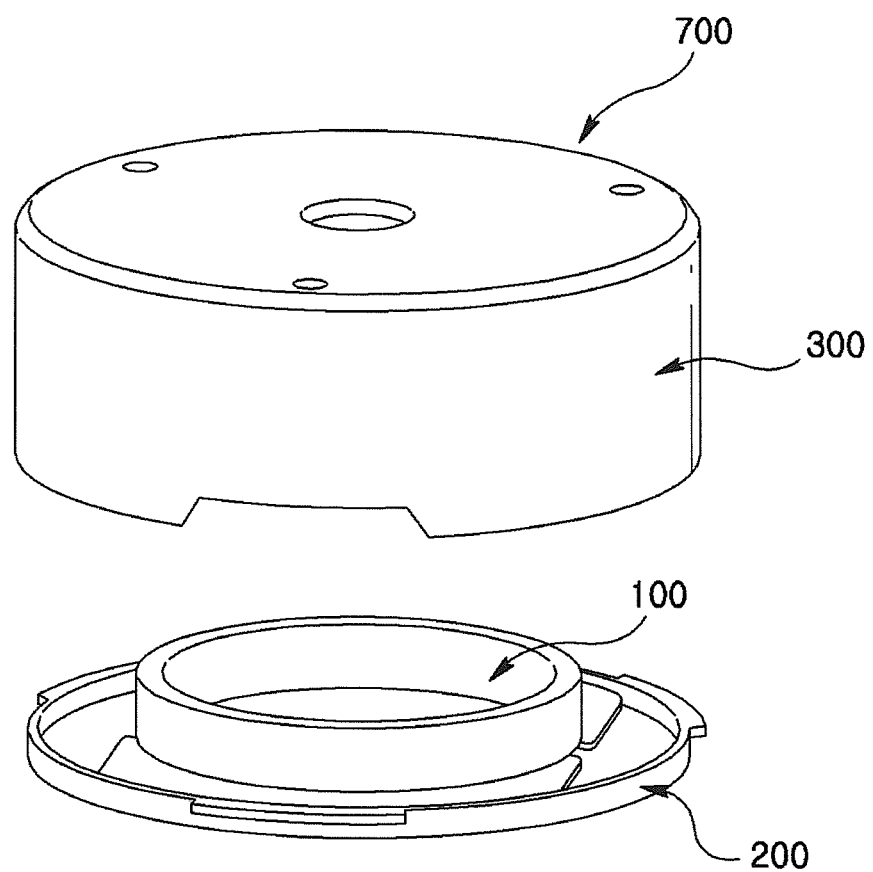
FIG. 1 is an exploded perspective view of a linear vibrator according to an exemplary embodiment of the present disclosure.

Hereinafter, exemplary embodiments of the present disclosure are described in detail with reference to the accompanying drawings. In the drawings, sizes or shapes of constituent elements may be exaggerated for clarity and convenience.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification. Acronyms may be used extensively throughout the description to avoid excessively long descriptive phrases. The meaning will be clear from the context of the description.

Figure 2:
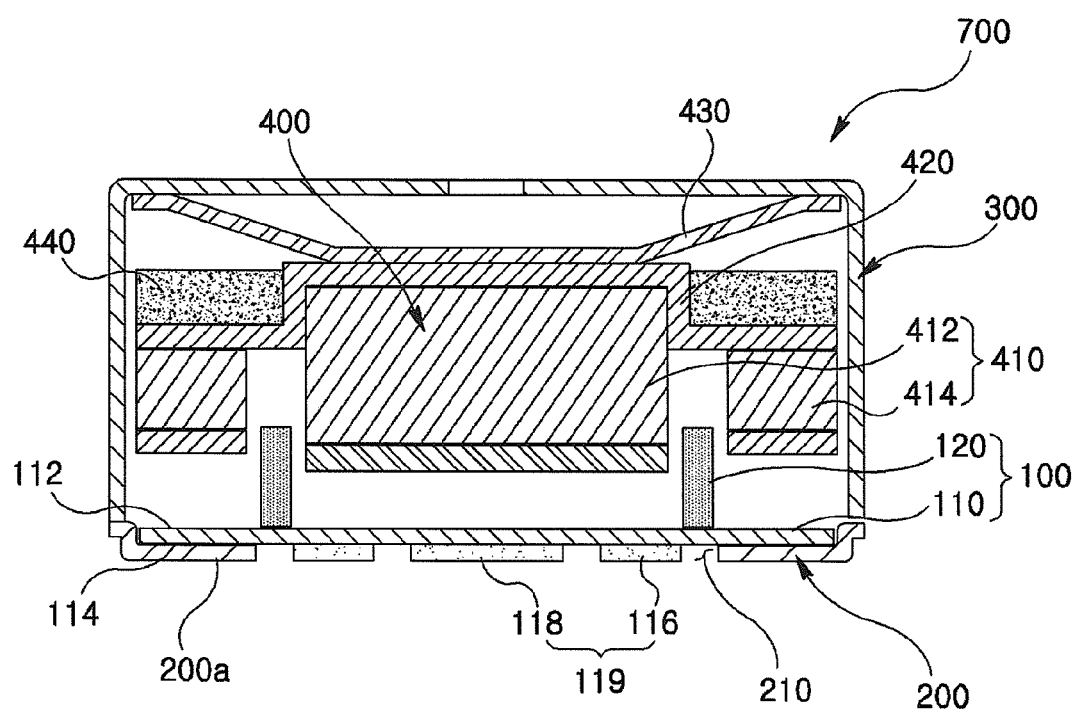
FIG. 2 is a cross-sectional view of a linear vibrator of FIG. 1.

FIG. 1 is an exploded perspective view of a linear vibrator according to an exemplary embodiment of the present disclosure, and FIG. 2 is a cross-sectional view of a linear vibrator of FIG. 1.

Referring to FIGS. 1 and 2, a linear vibrator (700) includes a stator (100), a first cover (200), a second cover (300) and a vibrator (400. See FIG. 2).

Figure 3:
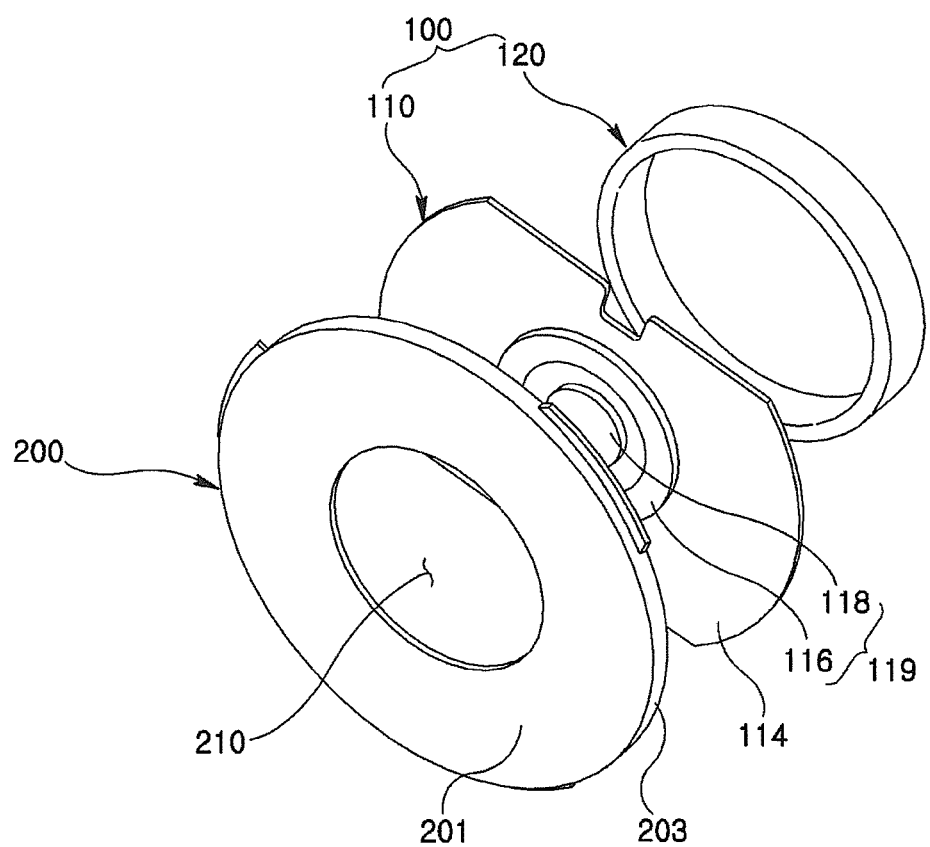
FIG. 3 is an exploded perspective view of a stator and a first cover.
Figure 4:
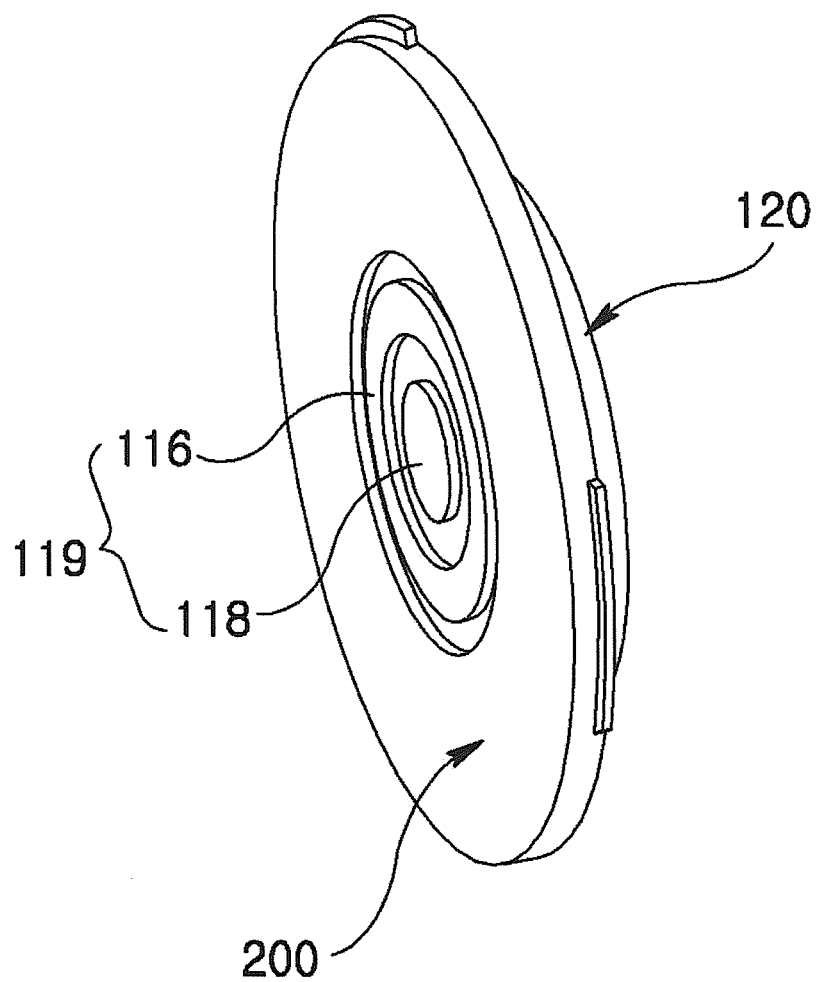
FIG. 4 is a perspective view illustrating the stator and the first cover of FIG. 3 that are assembled.

FIG. 3 is an exploded perspective view of a stator and a first cover, and FIG. 4 is a perspective view illustrating the stator and the first cover of FIG. 3 that are assembled.

Referring to FIGS. 3 and 4, the stator (100) includes a circuit substrate (110) and a coil block (120). The circuit substrate (110) functions so transmit a driving signal provided from outside of the linear vibrator (700) to the coil block (120).

The circuit substrate (110) may take the shape of a rectangle when viewed in a top plan view to thereby reduce the manufacturing cost. Alternatively, the circuit substrate (110) may take the shape of a disk to form a smaller diameter than that of the second cover (300, described later).

Referring to FIGS. 3 and 4 again, the circuit substrate (110) includes an upper surface (112) and a bottom surface (114) facing the upper surface (112), where the bottom surface (114) faces the first cover (200) and the upper surface faces the second cover (300).

The bottom surface (114) of the circuit substrate (110) is formed with a connection terminal (119). The connection terminal (119) in the exemplary embodiment of the present disclosure includes a first connection terminal (116) and a second connection terminal (118). The first and second connection terminals (116, 118) are centrally arranged in the bottom surface of the circuit substrate (110), for example.

The first connection terminal (116) takes the shape of a band when viewed in a top plan view, and the second connection terminal (118) takes the shape of a plate when viewed in a top plan view.

The first connection terminal (116) in the exemplary embodiment of the present disclosure may take the shape of a closed loop ring, a closed loop square frame and a closed loop polygonal frame, for example, and the second connection terminal (118) may take the shape of a disk, a square plate and a polygonal plate, for example.

Alternatively, the first connection terminal (116) in the exemplary embodiment of the present disclosure may take the shape of a partially opened loop, and the second connection terminal (118) may take the shape of a plate, for example.

The first and second connection terminals (116, 118) may include a metal having a low melting point such as a solder.

The coil block (120) takes the shape of upper and bottom surfaces-opened cylinder. The cylindrical coil block (120) is arranged at an upper surface (112) of the circuit substrate (110). The coil block (120) is arranged on the upper surface (112) of the circuit substrate via an adhesive, and a distal end of a coil comprising the coil block (120) is electrically connected to the first and second connection terminals (116, 118).

For example, the circuit substrate (110) includes a conductive via (not shown) passing through the upper and bottom surfaces (112, 114) of the circuit substrate (110). The first and second connection terminals (116, 118) and the coil block (120) are electrically connected via the conductive via (not shown).

Figure 5:
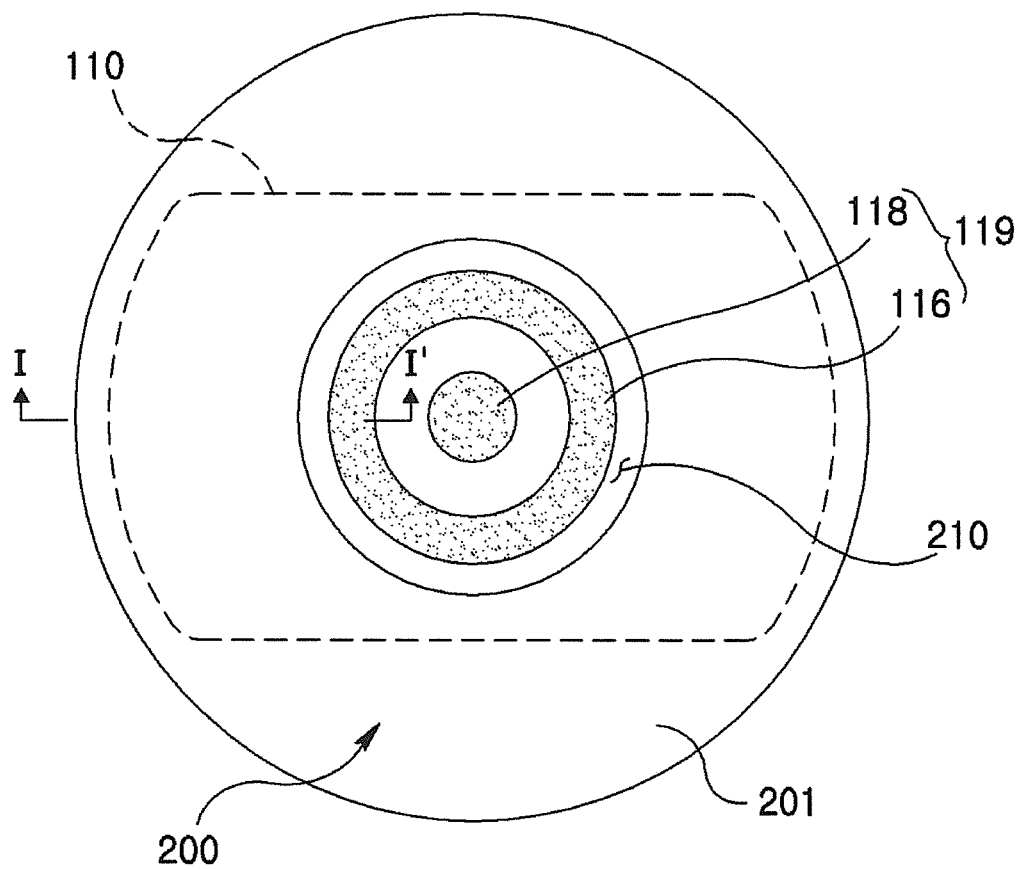
FIG. 5 is a rear view of a first cover illustrated in FIG. 4.
Figure 6:
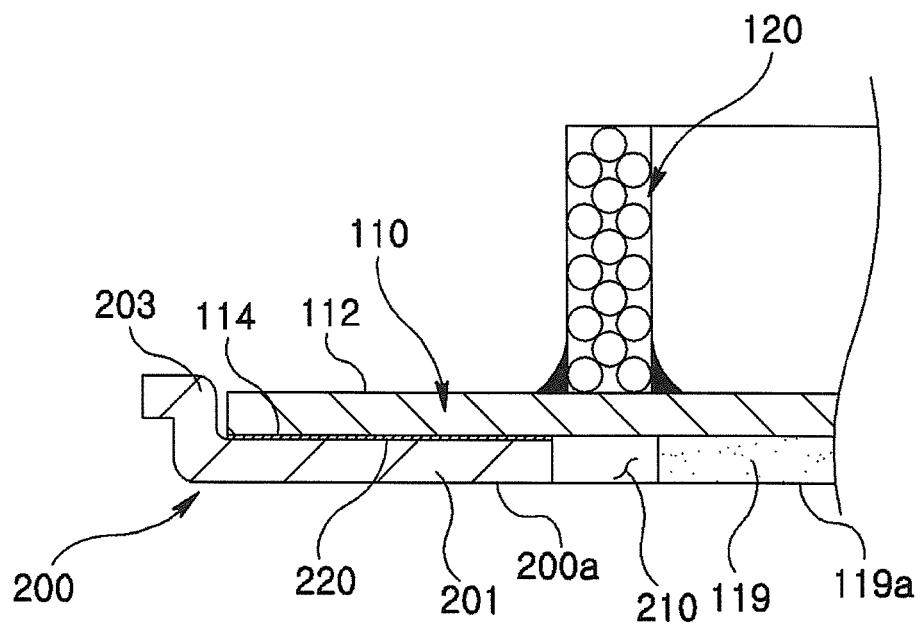
FIG. 6 is a cross-sectional view taken along line 'I-I' of FIG. 5.

FIG. 5 is a rear view of a first cover illustrated in FIG. 4, and FIG. 6 is a cross-sectional view taken along line 'I-I' of FIG. 5.

Referring to FIGS. 5 and 6, the first cover (200) takes the shape of a circular tray. The first cover (200) includes a lateral wall (203) extended from a floor plate (201) and an edge of the floor plate (201), and is formed with an accommodation space by the floor plate (201) and the lateral wall (203). The first cover (200) according to an exemplary embodiment of the present disclosure may include a metal plate, for example.

An upper surface of the floor plate (201) of the first cover (200) is arranged with the circuit substrate (110), whereby the upper surface of the floor plate (201) is arranged with a bottom surface (114) of the circuit substrate (110). An adhesive member (220) is arranged between the bottom surface (114) of the circuit substrate and the upper surface of the floor plate (201) according to an exemplary embodiment of the present disclosure.

The adhesive member (220) functions to bond the circuit substrate (110) and the first cover (200), to electrically insulate the circuit substrate (110) and the first cover (200) and to inhibit the circuit substrate (110) from being broken by absorbing shocks applied from outside.

In the exemplary embodiment of the present disclosure, the first cover (200) is formed with an opening (210) that exposes the connection terminal (119) formed at the bottom surface (114) of the circuit substrate (110). The connection terminal (119) formed at the bottom surface (114) of the circuit substrate (110) by the opening (210) is exposed to the outside. The connection terminal (119) exposed by the opening (210) of the first cover (200) is electrically connected to a connection terminal (not shown) of an outside circuit substrate (not shown).

In the exemplary embodiment of the present disclosure, the opening (210) takes a shape corresponding to that of the connection terminal (119), and size of the opening (210) is greater than that of the connection terminal (119). In the exemplary embodiment of the present disclosure, an external lateral surface (200a) of the first cover (200) and an upper surface (119a) of the connection terminal (119) are arranged on the same planar surface. In a case the external lateral surface (200a) of the first cover (200) and the upper surface (119a) of the connection terminal (119) are arranged on the same planar surface, the external lateral surface (200a) of the first cover (200) can be electrically connected to the connection terminal of the outside circuit substrate without any gap.

Figure 7:
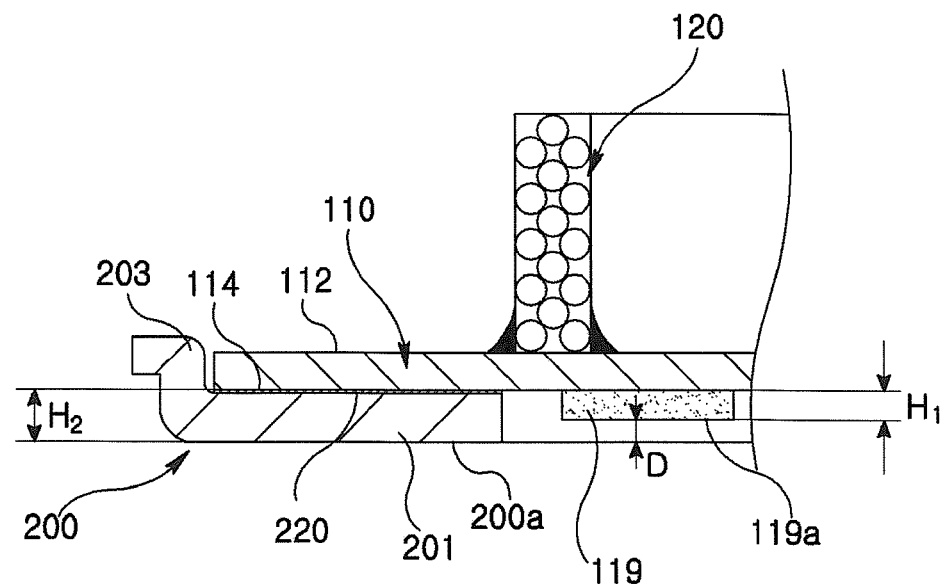
FIG. 7 is a cross-sectional view illustrating a first cover and a stator according to an exemplary embodiment of the present disclosure.

FIG. 7 is a cross-sectional view illustrating a first cover and a stator according to an exemplary embodiment of the present disclosure.

Referring to FIG. 7, the upper surface (119a) of the connection terminal (119) arranged at the bottom surface (114) of the circuit substrate (110) may be arranged at a lower position than that of the external lateral surface (200a) of the first cover (200).

That is, a height (H1) of the connection terminal (119) arranged at the bottom surface (114) of the circuit substrate (110) has a thickness thinner than a thickness (H2) of the first cover (200). For example, when measured from the external lateral surface (200a) of the first cover (200), a height difference between the upper surface (119a) of the connection terminal (119) and the external lateral surface (200a) of the first cover (200) may be approximately 0.2 mm.

Meanwhile, thickness of the connection terminal (119) arranged at the bottom surface (114) of the circuit substrate (110) may be approximately less than 70% of an entire thickness of the first cover (200).

In the exemplary embodiment of the present disclosure, in a case the upper surface (119a) of the connection terminal (119) is lower than the external lateral surface (200a) of the first cover (200), the external lateral surface (200a) of the first cover (200) can be electrically connected to a connection terminal of outside circuit substrate without any gap.

Referring to FIG. 4 again, the first cover (200) having the opening (210) exposing the connection terminal (119) of the circuit substrate (110) includes a conductive metal for protecting the stator (100) and the vibrator (400) against outside shock or shock generated from drop. Therefore, in a case the inner lateral surface of the first cover (200) formed by the opening (210) and the connection terminal (119) are adjacently arranged, the connection terminal (119) and the first cover (200) may be short-circuited.

In the exemplary embodiment of the present disclosure, an insulation member may be formed at a space between the connection terminal (119) and the inner lateral surface of the first cover (200) in order to inhibit the electrical short-circuit of the connection terminal (119) and the first cover (200). The insulation member is such that an upper surface of the connection terminal (119) may be exposed to the outside.

Meantime, the insulation member may be formed between the first connection terminal (116) and the second connection terminal (118), and the insulation member interposed between the first connection terminal (116) and the second connection terminal (118) can inhibit the first and second connection terminals (116, 118) from being short-circuited.

Figure 8:
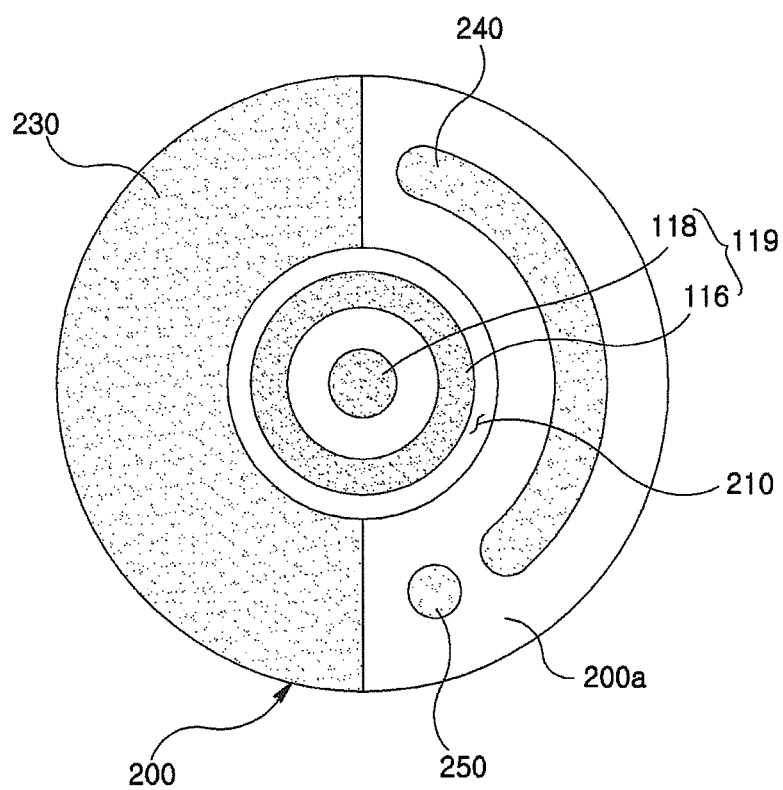
FIG. 8 is a plan view illustrating a dummy solder membrane formed on the first cover of FIG. 3.

FIG. 8 is a plan view illustrating a dummy solder membrane formed on the first cover of FIG. 3.

Referring to FIG. 8, the connection terminal (119) exposed from the first cover (200) is electrically and physically connected to a connection terminal of the outside circuit substrate, and the linear vibrator (700) is fixed to the outside circuit substrate by connection between the connection terminal (119) of the circuit substrate (110) and the connection terminal of the outside circuit substrate. However, the connection terminal (119) of the circuit substrate (110) and the connection terminal of the outside circuit substrate may be separated or broken, because the connection terminal (119) of the circuit substrate (110) and the connection terminal of the outside circuit substrate contain solder of low mechanical strength and a connection area therebetween is small.

In order to inhibit breakage of the connection terminal (119) of the circuit substrate (110) and the connection terminal of the outside circuit substrate, the external lateral surface (200*a*) of the first cover (200) may be formed with dummy solder membranes (230, 240, 250).

The solder membrane (230) may be formed on an entire area of the external lateral surface (200*a*) of the first cover (200), and the outside circuit substrate may be formed with a dummy solder pattern having a shape and a size corresponding to those of the dummy solder membrane (230). The dummy solder membrane (230) and the dummy solder pattern are mutually connected to greatly enhance a bonding strength between the first cover (200) and the outside circuit substrate.

The dummy solder membrane (240), when viewed in a top plan view, may be formed on the external lateral surface (200*a*) of the first cover (200) in a close loop shape, or may be formed on the external lateral surface (200*a*) of the first cover (200) in an open loop shape, and the outside circuit substrate may be formed with a dummy solder pattern having a shape and a size corresponding to those of the dummy solder membrane (240). The solder membrane (240) and the dummy solder pattern are mutually connected to greatly enhance a bonding strength of the first cover (200) and the outside circuit substrate.

The dummy solder membrane (250), when viewed in a top plan view, may be formed on the external lateral surface (200*a*) of the first cover (200) in a dot shape, and the outside circuit substrate may be formed with a dummy solder pattern having a shape and a size corresponding to those of the dummy solder membrane (240). The solder membrane (250) and the dummy solder pattern are mutually connected to greatly enhance a bonding strength of the first cover (200) and the outside circuit substrate.

In the exemplary embodiment of the present disclosure, the dummy solder membranes (230, 240, 250) may be complexly formed on the external lateral surface (200*a*) of the first cover (200).

Figure 9:
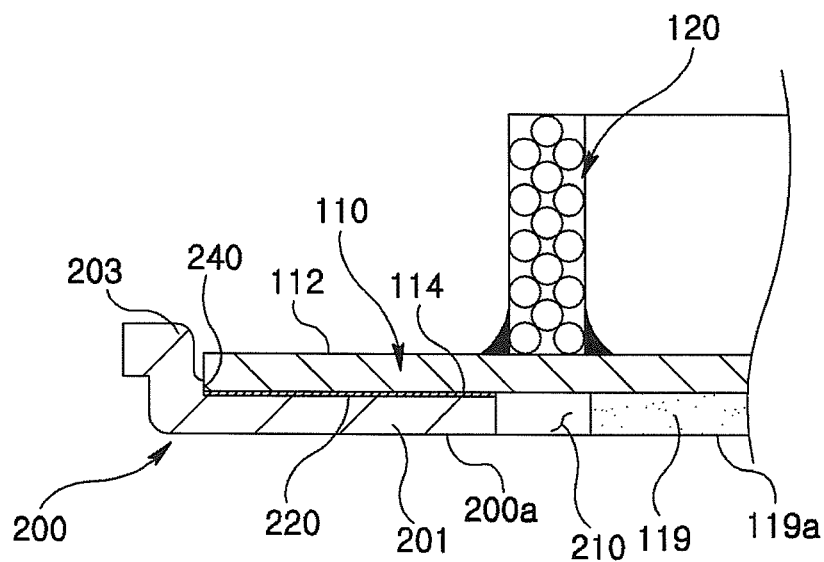
FIG. 9 is a cross-sectional view of a circuit substrate accommodation groove formed on the first cover according to an exemplary embodiment of the present disclosure.

FIG. 9 is a cross-sectional view of a circuit substrate accommodation groove formed on the first cover according to an exemplary embodiment of the present disclosure.

Referring to FIG. 9, the linear vibrator (700) may be increased in volume and thickness by thickness of the first cover (200) and the circuit substrate (110), because the circuit substrate (110) is arranged on the floor plate (201) of the first cover (200).

In the exemplary embodiment of the present disclosure, in order to reduce the overall volume and thickness of the linear vibrator (700) through reduction in volume and thickness of first cover (200) and the circuit substrate (110), an upper surface of the floor plate (201) of the first cover (200) may be formed with a circuit substrate accommodation groove (240) accommodating at least a part of the circuit substrate (110).

Figure 10:
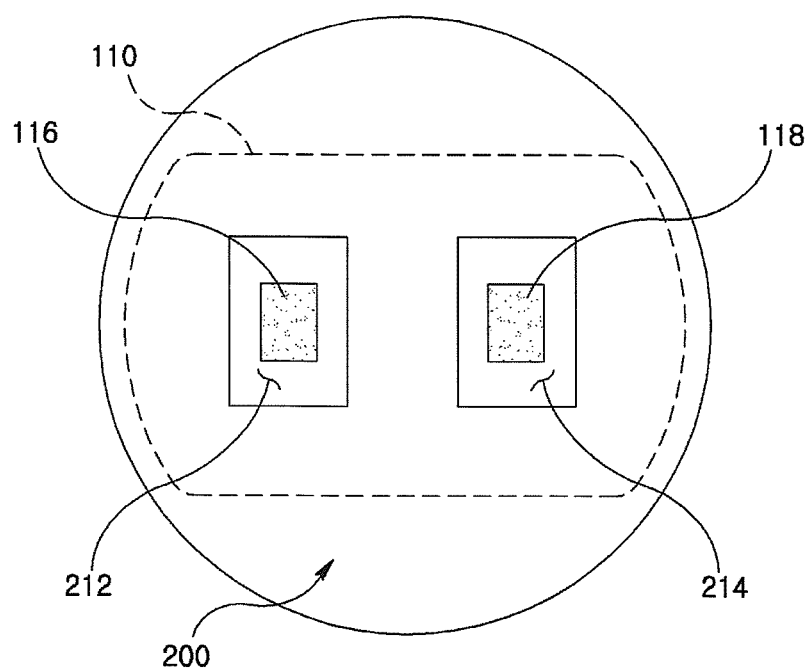
FIG. 10 is a cross-sectional view of an opening and a connection terminal formed on the first cover according to an exemplary embodiment of the present disclosure.

FIG. 10 is a cross-sectional view of an opening and a connection terminal formed on the first cover according to an exemplary embodiment of the present disclosure.

Referring to FIG. 10, the first cover (200) may be formed with a first opening (212) and a second opening (214) discrete at a predetermined interval from the first opening (212). In the exemplary embodiment of the present disclosure, each of the first opening (212) and the second opening (214) may take the shape of a circle, a square and a polygon, when viewed in a top plan view.

Meanwhile, the circuit substrate (110) may be formed with a first connection terminal (116) formed at a position corresponding to that of the first opening (212) and exposed from the first cover (200), and a second connection terminal (118) formed at a position corresponding to that of the second opening (214) and exposed from the first cover (200).

In the exemplary embodiment of the present disclosure, each of the first connection terminal (116) and the second connection terminal (118) may take the shape corresponding to that of each of the first and second openings (212, 214).

Referring to FIG. 1 again, the second cover (300) may take the shape of a bottom-opened cylinder. The second cover (300) contacts a lateral wall (203) of the first cover (200), where the first and second covers (200, 300) are mutually coupled by welding or the like.

As the first and second covers (200, 300) are mutually coupled, there is formed an accommodation space between the first and second covers (200, 300).

Referring to FIG. 2 again, the vibrator (400) includes a magnet (410), a yoke (420) and an elastic member (430). The vibrator (400) may further include a weight (440). The magnet (410) of the vibrator (400) vertically moves in the coil block (120) by a magnetic force generated by the magnet (410) and a magnetic force generated by the coil block (120).

The magnet (410) may include a first magnet (412) inserted into the coil block (120) and a second magnet (414) wrapping an external lateral surface of the coil block (120), for example.

The yoke (420) fixes the first and second magnets (412, 414). The elastic member (430) is fixed to the yoke (420) and an inner lateral surface of the second cover (300) facing the yoke (420). In the exemplary embodiment of the present disclosure, the elastic member (430) may be a leaf spring, for example.

The weight (440) is fixed to the yoke (420) to further enhance the vibration characteristics of the vibrator (400).

As apparent from the foregoing, the linear vibrator according to the present disclosure has an industrial applicability in that a cover of the linear vibrator is formed with a metal to inhibit destruction caused by shock from drop or shock applied from outside, and an opening for exposing a connection terminal of a circuit substrate arranged inside the cover the linear vibrator is formed to allow the connection terminal of the circuit substrate to be directly mounted to a connection terminal of an outside circuit substrate.

The above-mentioned linear vibrator according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A linear vibrator, comprising:
   a stator including a circuit substrate formed at a bottom surface with a connection terminal and a coil block arranged at an upper surface opposite to the bottom surface and electrically connected to the connection terminal;
   a first cover arranged at the bottom surface of the circuit substrate and formed with an opening for exposing the connection terminal;
   a second cover coupled to the first cover in a bottom-opened cylindrical shape; and
   a vibrator including a magnet arranged inside the coil block, a yoke in which the magnet is mounted, and an elastic member coupled to the yoke and the second cover to vertically vibrate the magnet relative to the coil block,
   wherein the opening of the first cover includes a first opening and a second opening discrete from the first opening, and
   wherein the circuit substrate opposite to the first opening is arranged with a first connection terminal electrically connected to the coil block, and the circuit substrate opposite to the second opening is arranged with a second connection terminal electrically connected to the coil block.

2. The linear vibrator of claim 1, wherein the first and second connection terminals include solder.

3. The linear vibrator of claim 1, wherein each of the first and second openings takes the shape of any one shape of a circle, a square and a polygon when viewed in a top plan view.

4. The linear vibrator of claim 1, wherein the first connection terminal exposed by the opening of the first cover takes the shape of a band, and the second connection terminal takes the shape of a plate arranged inside the first connection terminal.

5. The linear vibrator of claim 1, wherein an upper surface of the connection terminal and a periphery of the first cover are on the same planar surface.

6. The linear vibrator of claim 1, wherein the connection terminal has a thinner thickness than that of the first cover.

7. The linear vibrator of claim 6, wherein a height difference between the upper surface of the connection terminal and the periphery of the first cover is 0.1 mm.

8. The linear vibrator of claim 6, wherein a thickness of the connection terminal is less than 70% of that of the first cover.

9. The linear vibrator of claim 1, wherein the circuit substrate takes the shape of a rectangle when viewed in a top plan view.

10. The linear vibrator of claim 1, further comprising a bonding member interposed between the circuit substrate and the first cover to absorb shock and to bond the circuit substrate and the first cover.

11. The linear vibrator of claim 1, wherein the first cover includes a dummy solder membrane formed on at least a part of the periphery of the first cover to be bonded to a dummy solder pattern of an outside substrate.

12. The linear vibrator of claim 11, wherein the dummy solder membrane is formed on the first cover in any one shape of a surface shape, a line shape and a spot shape.

13. The linear vibrator of claim 1, wherein an inner lateral surface of the first cover arranged with the circuit substrate is formed with a circuit substrate accommodation groove for accommodating the circuit substrate to reduce the thickness of the circuit substrate.

14. The linear vibrator of claim 1, wherein the first and second covers are mutually coupled by welding.

15. The linear vibrator of claim 1, wherein the magnet includes a first magnet fixed to the yoke and moving inside the coil block, and a second magnet fixed to the yoke to wrap an exterior of the coil block.

16. The linear vibrator of claim 1, further comprising a weight.

17. The linear vibrator of claim 1, wherein the elastic member includes a leaf spring connected to the yoke and an inner lateral surface of the second cover.

* * * * *